US008777805B2

(12) United States Patent
Grutter et al.

(10) Patent No.: US 8,777,805 B2
(45) Date of Patent: Jul. 15, 2014

(54) SYSTEM AND METHOD FOR CONTROLLING A DRIVELINE IN A HYBRID VEHICLE

(75) Inventors: Peter John Grutter, Plymouth, MI (US); Andreas E. Perakes, Canton, MI (US); Nicholas E. McCubbin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 13/465,894

(22) Filed: May 7, 2012

(65) Prior Publication Data

US 2013/0296115 A1 Nov. 7, 2013

(51) Int. Cl.
*B60W 10/02* (2006.01)
*B60W 10/08* (2006.01)

(52) U.S. Cl.
USPC ................................. 477/5; 903/916

(58) Field of Classification Search
USPC ........................ 477/3, 5, 8, 174, 175, 180, 181
See application file for complete search history.

(56) References Cited

U.S. PATENT DOCUMENTS

| 6,638,195 | B2 * | 10/2003 | Williams | 477/5 |
| 7,533,754 | B2 | 5/2009 | Burrows et al. | |
| 7,537,534 | B2 | 5/2009 | Janson et al. | |
| 7,594,560 | B2 * | 9/2009 | Homan et al. | 180/233 |
| 7,631,719 | B2 * | 12/2009 | Wenthen | 180/243 |
| 7,870,925 | B2 | 1/2011 | Perakes et al. | |
| 2009/0076696 | A1 | 3/2009 | Perkins et al. | |
| 2012/0024614 | A1 * | 2/2012 | Sigmund et al. | 180/248 |

* cited by examiner

*Primary Examiner* — Justin Holmes
(74) *Attorney, Agent, or Firm* — David B. Kelley; Brooks Kushman P.C.

(57) ABSTRACT

A system and a method for controlling a hybrid vehicle powertrain during a change from a two-wheel drive mode to a four-wheel drive mode is provided. In response to a request to couple the second pair of wheels to the powertrain, a driveline controller commands an increased torque from the electric motor to be applied to the first pair of wheels The increased torque from the electric motor is based on an AWD engagement torque of the second pair of wheels to counteract an engagement torque of a second pair of drive wheels before changing from the two-wheel drive mode to the four-wheel drive mode.

20 Claims, 4 Drawing Sheets

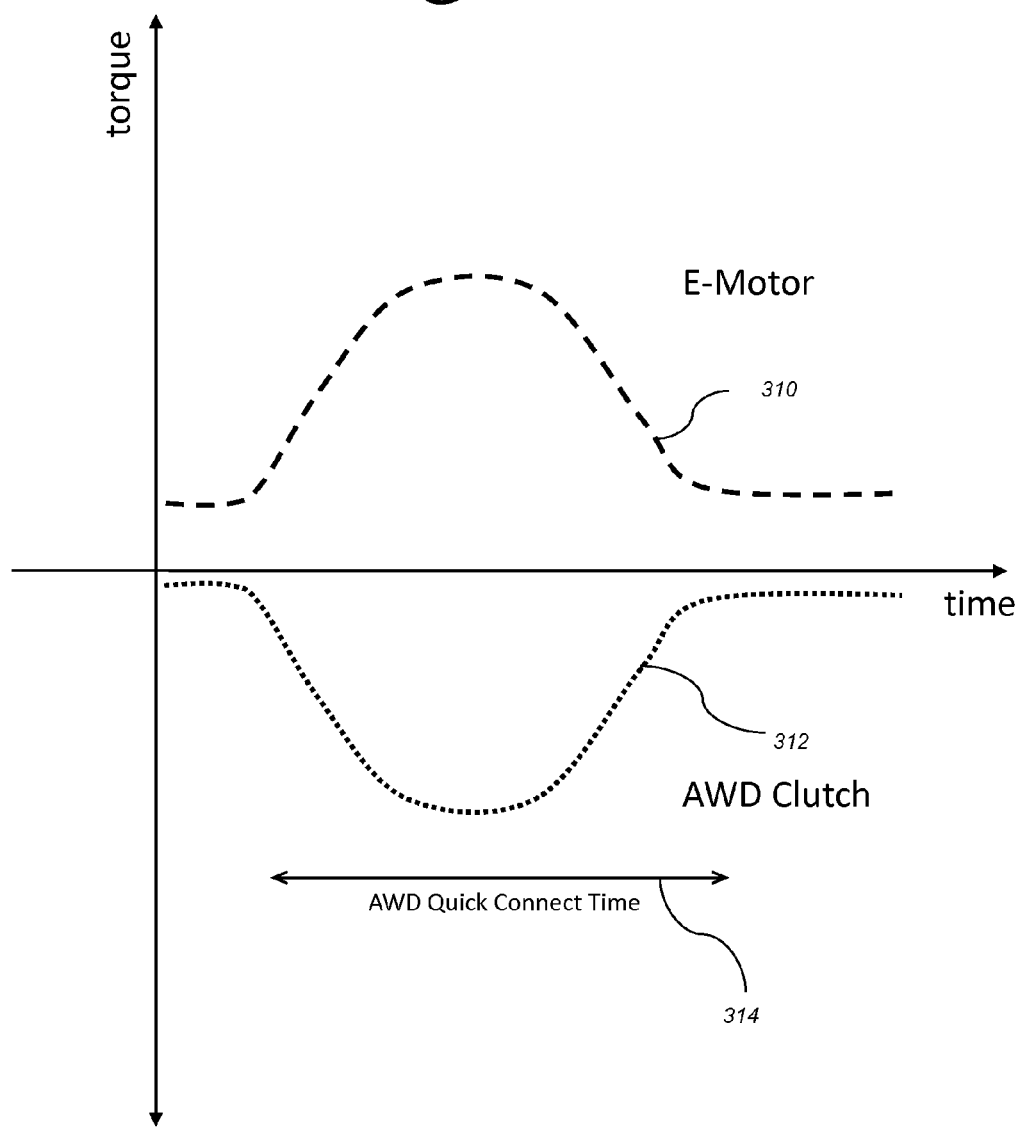

SYSTEM AND METHOD FOR CONTROLLING A DRIVELINE IN A HYBRID VEHICLE

TECHNICAL FIELD

This disclosure relates to a system and method of controlling a hybrid vehicle driveline between a two-wheel drive mode and a four-wheel drive mode.

BACKGROUND

A hybrid electric vehicle powertrain includes an engine and an electric motor, wherein torque produced by the engine and/or by the motor can be transferred through a transmission to the vehicle drive wheels to propel the vehicle. A traction battery supplies energy to the motor for the motor to produce the positive motor torque for propelling the vehicle. The motor may provide negative motor torque to the transmission (for example, during regenerative braking of the vehicle) and thereby act as a generator to the battery. The engine may also provide negative engine torque to the transmission to provide engine braking for powertrain braking of the vehicle.

In a modular hybrid transmission ("MHT") configuration, the engine is connectable to the motor by a disconnect clutch and the motor is connected to the transmission. The engine, the disconnect clutch, the motor, and the transmission are connected sequentially in series.

The hybrid electric vehicle may also include a four-wheel or all-wheel drive (AWD) driveline, to provide better traction than a two-wheel drive vehicle. To improve fuel economy in an AWD vehicle, the vehicle may normally operate in a two-wheel drive mode and selectively engage all four wheels only when conditions necessitate greater traction.

SUMMARY

In one embodiment of the disclosure, a hybrid vehicle being operable to change between a two-wheel drive mode and an all-wheel drive (AWD) mode is provided. The hybrid vehicle includes a powertrain having an electric motor. A primary driveline includes a primary pair of drive wheels. A secondary driveline includes a secondary pair of drive wheels. An AWD disconnect device is arranged to couple the powertrain to the secondary pair of wheels when the AWD mode is required. In response to a request to engage the AWD disconnect device, a controller commands the electric motor to apply a torque to the primary driveline. The increased torque from the electric motor is based on an AWD engagement torque of the secondary driveline. The electric motor applies the increased torque such that the secondary driveline accelerates while a speed of the secondary driveline is less than a speed of the primary driveline.

In another embodiment, the AWD disconnect device includes at least one AWD clutch arranged to transmit torque from the secondary driveline to the secondary pair of drive wheels when engaged. The AWD disconnect device also includes a disconnect mechanism arranged to connect and disconnect the powertrain to the secondary driveline.

In another embodiment, the electric motor torque is proportional to the engagement torque of the AWD clutch in order to minimize vehicle deceleration caused by engagement of the AWD disconnect device when at least a portion of secondary driveline is rotating asynchronously with the primary driveline.

In another embodiment, the controller controls operation of the disconnect mechanism and the at least one AWD clutch.

In another embodiment, controller quickly engages the at least one AWD clutch and the disconnect mechanism in an engagement time generally less than 500 ms.

In another embodiment, the controller commands the disconnect mechanism to engage after the second pair of drive wheels achieve a generally synchronous speed with the primary pair of drive wheels.

In another embodiment, the disconnect mechanism comprises a dog clutch. The controller commands the dog clutch to engage after the secondary driveline is synchronized using torque applied using the AWD clutch.

In another embodiment, the disconnect mechanism comprises a synchronizer and a gear mechanism having a limited ability to apply torque to accelerate the secondary driveline. The controller commands the synchronizer and the gear mechanism to engage such that the AWD clutch is also engaged in order to synchronize the secondary driveline quickly.

In another embodiment, the disconnect mechanism comprises a clutch. The controller commands the disconnect clutch and the AWD clutch to cooperatively engage in order to synchronize the secondary driveline quickly.

In another embodiment, controller commands synchronization of the secondary driveline when an AWD function is required.

In one other embodiment, a vehicle control system is provided. The control system includes a powertrain having an electric motor and first and second pairs of wheels. In response to a request to couple the second pair of wheels to the powertrain, a driveline controller commands an increased torque from the electric motor to be applied to the first pair of wheels. The increased torque from the electric motor is based on an AWD engagement torque of the second pair of wheels before coupling the second pair of wheels to the powertrain.

In another embodiment, the controller controls operation of an AWD disconnect device for coupling and decoupling the second pair of wheels when the four-wheel drive mode is required.

In another embodiment, the increased electric motor torque is proportional to the AWD engagement torque in order to counteract vehicle deceleration caused by engagement of the AWD disconnect device.

In another embodiment the controller quickly changes from a two-wheel drive mode to the four-wheel drive mode in an engagement time generally less than 500 ms.

In another embodiment the controller commands the AWD disconnect device to engage when the second pair of wheels achieve a generally synchronous speed with the first pair of wheels prior to being connected to the powertrain.

In one other embodiment, a method for controlling a hybrid vehicle powertrain during a change from a two-wheel drive mode to a four-wheel drive mode is provided. In response to the request to change from a two-wheel drive mode to the four-wheel drive mode, the method includes providing an increased torque by an electric-motor to a first pair of drive wheels to counteract an engagement torque of a second pair of drive wheels before changing from the two-wheel drive mode to the four-wheel drive mode.

In another embodiment, the method includes measuring the speed of the second pair of wheels to determine the engagement torque of the second pair of wheels. At least one clutch is engaged to connect the second pair of wheels to the powertrain.

In another embodiment, the method includes engaging at least one disconnect device to connect the second pair of wheels to the powertrain after the second pair of drive wheels achieve a generally synchronous speed with the first drive wheels.

In another embodiment, the method includes requesting a quick connect event to change from two-wheel drive mode to four-wheel drive mode based on vehicle driving conditions.

In another embodiment, the method includes receiving vehicle driving conditions to determine whether four-wheel drive mode is required.

BRIEF DESCRIPTION OF THE DRAWINGS

FIG. 3 is a graph illustrating operating characteristics of the vehicle of FIG. 1 according to an embodiment of the disclosure.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
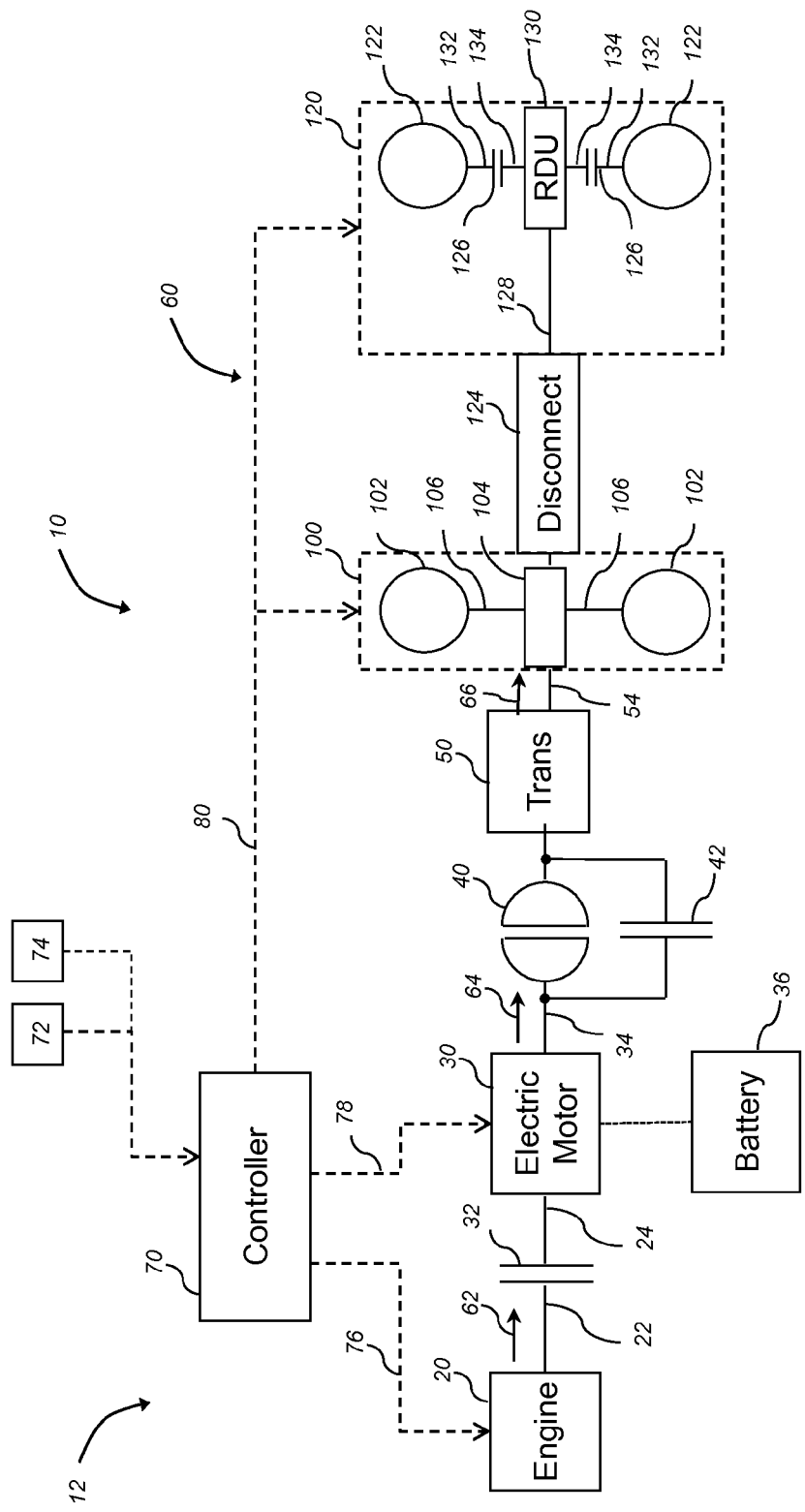
FIG. 1 is a schematic view of a hybrid vehicle according to an embodiment of the disclosure.

FIG. 1 illustrates a schematic diagram of a hybrid vehicle 10 according to an embodiment of the disclosure. A block diagram of an exemplary powertrain system 12 for a hybrid electric vehicle 10 in accordance with an embodiment of the present disclosure is shown. Powertrain system 12 includes an engine 20, an electric machine such as an electric motor/generator 30 ("motor"), a traction battery 36, and a multiple step-ratio automatic transmission 50.

The engine 20 and the motor 30 are drive sources for the vehicle 10. Engine 20 is connectable in series to motor 30 through a disconnect clutch 32. The motor 30 is connected to the input side of transmission 50. For example, the motor 30 may be connected to transmission 50 via a torque converter 40 and bypass clutch 42 between the motor 30 and the input side of transmission 50. The input side of the transmission 50 is connected in series with both the engine 20 and the motor 30 when the engine 20 is connected to the motor 30 via the disconnect clutch 32. In this case, the transmission 50 is connected to the motor 30 while at the same time being connected to the engine 20 via the motor 30. On the output side, the transmission 50 is connected to the drivetrain 60 and drive wheels of the vehicle. The driving force applied from engine 20 and/or motor 30 is transmitted through transmission 50 to the drive wheels thereby propelling the vehicle 10. FIG. 1 illustrates a hybrid vehicle 10 having an all-wheel drive (AWD) drivetrain 60, which will be discussed in more detail below.

The engine 20 has an engine shaft 22 connectable to an input shaft 24 of the motor 30 through the disconnect clutch 32. Although the disconnect clutch 32 is described and illustrated as a hydraulic clutch, other types of clutches may be used. The motor 30 has an output shaft 34 connected to the input side of the transmission 50. Transmission 50 includes multiple discrete gear ratios automatically selectable by a vehicle controller in response to vehicle operating conditions and a driving mode selected by the operator.

The engine 20 is a one source of power for powertrain system 12. The engine 20 may be an internal combustion engine such as a gasoline, diesel, or natural gas powered engine, for example. The engine 20 generates an engine power having an engine torque 62 that is supplied to transmission 50 when the engine 20 and the motor 30 are connected via the disconnect clutch 32. The engine power corresponds to the product of engine torque 62 and the engine speed. To drive the vehicle 10 with the engine 20, at least a portion of the engine torque 62 passes from the engine 20 through disconnect clutch 32 to the motor 30 and then from the motor 30 to the transmission 50.

The traction battery 36 is another source of power for the powertrain system 12. The motor 30 is linked to battery 36. In one example the battery 36 is configured to connect to an external electric grid, such as for a plug-in electric hybrid vehicle (PHEV) with the capability to recharge the battery from an electric power grid, which supplies energy to an electrical outlet at a charging station.

Depending on the particular operating mode of the vehicle, the motor 30 either converts electric energy stored in the battery 36 into a motor power having a motor torque 64 or sends a corresponding amount of electrical power to battery 36 when operating as a generator. The motor power corresponds to the product of motor torque 64 and the motor speed of motor 30. To drive the vehicle 10 with the motor 20, the motor torque 64 is transmitted from the motor 30 to the transmission 50. When generating electrical power for storage in the battery 36, the motor 30 obtains power either from the engine 20 in a driving mode or from the inertia and kinetic energy in the vehicle 10 as the motor 30 acts as a brake when operating in a regenerative braking mode.

As described, the engine 20, disconnect clutch 32, motor 30, and transmission 50 are connectable sequentially in series as illustrated in FIG. 1. As such, the powertrain system 12 represents a modular hybrid transmission ("MHT") configuration in which the engine 20 is connected to the motor 30 by the disconnect clutch 32 with the motor 30 being connected to the transmission 50.

The state or mode of the disconnect clutch 32 being engaged or disengaged determines whether the engine torque 62 and/or the motor torque 64 are transferred to the transmission 50. For example, if the disconnect clutch 32 is disengaged, then only the motor torque 64 is supplied to the transmission 50. If the disconnect clutch 32 is engaged/locked, then both engine torque 62 and motor torque 64 are supplied to transmission 50. Of course, if only the engine torque 62 is desired for the transmission 50, the disconnect clutch 32 is engaged/locked, but the motor 30 is not energized such that engine torque 62 is only supplied to transmission 50. Depending on the particular application and implementation, the disconnect clutch 32 may be operated in a limited slip mode.

The transmission 50 includes clutches, bands, gears, and the like, and may include one or more planetary gear sets to selectively effect different discrete gear ratios by selective engagement of friction elements to establish the torque flow paths and provide the corresponding desired multiple step-ratios or gear ratios. The friction elements are controllable through a shift schedule within the controller 70 or a dedicated transmission controller that connects and disconnects certain elements of the planetary gear sets to control the ratio between the transmission input and the transmission output. The transmission 50 is automatically shifted from one ratio to another based on the needs of the vehicle. The transmission 50 then provides the powertrain output torque 66 to the drivetrain.

The kinetic details of transmission 50 can be established by a wide range of transmission arrangements. The transmission 50 is an example of a transmission arrangement for use with embodiments of the present disclosure. Any multiple ratio transmission that accepts input torque(s) from an engine and/or a motor and then provides torque to an output shaft at the different ratios is acceptable for use with embodiments of the present disclosure.

The powertrain system 12 further includes a vehicle controller system 70. The powertrain system 12 further includes an accelerator pedal 72 and a brake pedal 74. The accelerator pedal 72 and the brake pedal 74 are in communication with the controller 70. The control system 70 for the vehicle 10 may include any number of controllers, and may be integrated into a single controller, or have various control modules. Some or all of the controllers may be connected by a controller area network (CAN) or other system. The controller may be configured to control operation of the various components of the transmission 50 the motor 30, and the engine 20 under any of a number of different conditions.

For example, the driver of the vehicle 10 depresses the accelerator pedal 72 to propel the vehicle. In response, a total drive command based on the positioning of the accelerator pedal 72 is provided to the controller 70. Controller 70 apportions the total drive command between the engine power and the motor power to be provided to the transmission 50 for propelling the vehicle. In particular, controller 70 apportions the total drive command between (i) an engine torque signal 76 (which represents the amount of engine torque 62 to be provided from the engine 20, operating at a corresponding engine speed, to the transmission 50 for propelling the vehicle) and (ii) a motor torque signal 78 (which represents the amount of motor torque 64 to be provided from the motor 30, operating at a corresponding motor speed, to the transmission 50 for propelling the vehicle). In turn, the engine 20 generates the engine power having engine torque 62 and the motor 30 generates the motor power having motor torque 64 for propelling the vehicle. Both engine torque 62 and motor torque 64 are supplied to transmission 50 (assuming that engine 20 is connected to motor 30 via disconnect clutch 32) such that the vehicle 10 is propelled. Such engine torque 62 and motor torque 64 for propelling the vehicle are referred to herein as "positive" torques. Those of ordinary skill in the art will recognize that the positive/negative naming convention is used for ease of description only.

The driver of the vehicle 10 depresses the brake pedal 74 to slow or brake the vehicle. In response, a total brake command based on the positioning of brake pedal 74 is provided to the controller 70. Controller 70 apportions the total brake command between (i) powertrain braking power to be provided by the engine 20 and/or the motor 30 to the transmission 50 for braking the vehicle 10 and (ii) friction braking power to be applied by the friction brakes to drive wheels for braking the vehicle. The powertrain braking power represents the amount of "negative" powertrain power to be provided by engine 20 and/or motor 30 to transmission 50 for braking the vehicle. Likewise, the controller 70 apportions the powertrain braking power between (i) the engine torque signal 76 (which in this case represents the amount of negative engine torque 62 to be provided from engine 20, operating at a corresponding engine speed, to transmission 50 for braking the vehicle) and (ii) a motor torque signal 78 (which in this case represents the amount of negative motor torque 64 to be provided from motor 30, operating at a corresponding motor speed, to transmission 50 for braking the vehicle). In turn, engine 20 generates the engine power having negative engine torque 62 and motor 30 generates the motor power having negative motor torque 64 for braking the vehicle. Both engine torque 62 and motor torque 64 are supplied to transmission 50 (assuming that engine 20 is connected to motor 30 via disconnect clutch 32) to brake the vehicle. The controller 70 further generates a friction braking torque signal 80 (which represents the amount of torque to be obtained through friction brakes). In turn, friction brakes apply the friction braking torque to drive wheels to brake the vehicle.

Figure 2A:
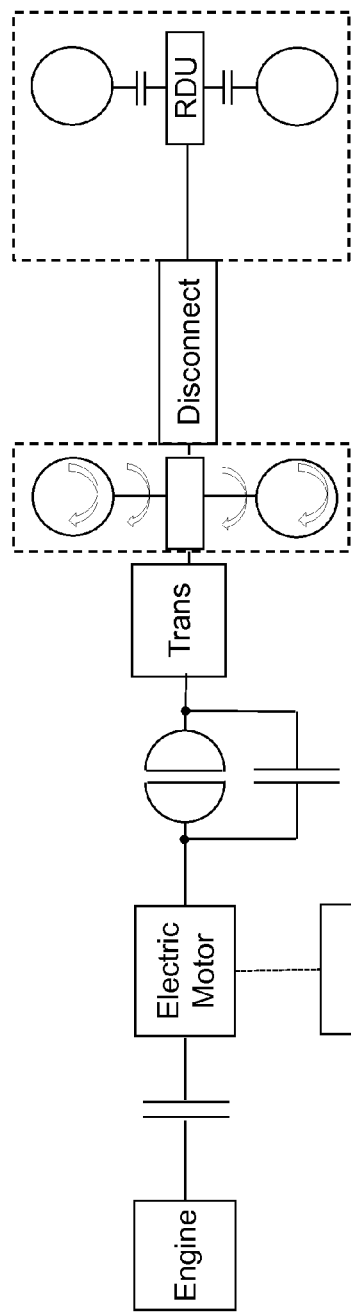
FIG. 2A is a schematic illustration of the vehicle shown in FIG. 1 operating in a two-wheel-drive mode.
Figure 2B:
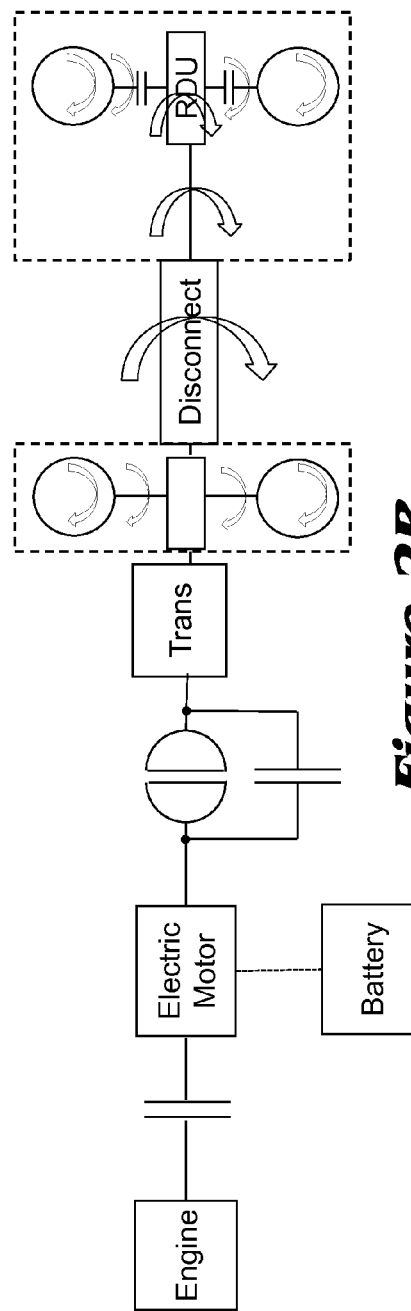
FIG. 2B is a schematic illustration of the vehicle shown in FIG. 1 operating in a four-wheel drive mode.

Turning now to FIGS. 2A and 2B, a schematic representation of a hybrid vehicle 10 having an all-wheel drive (AWD) drivetrain 60 architecture is illustrated. FIG. 2A shows the hybrid electric vehicle 10 operating in a two-wheel-drive mode where only a primary drivetrain 100 having a pair of drive wheels 102 are being driven by the powertrain. In contrast, FIG. 2B shows the hybrid electric vehicle 10 operating in a four-wheel drive mode where both the primary drivetrain 100 and a secondary drivetrain 120 having a secondary pair of drive wheels 122 are being driven by the powertrain 12. The four wheel drive mode may also be referred to as an AWD mode.

FIGS. 2A and 2B illustrate a drivetrain 60 architecture where the hybrid vehicle 10 is capable of automatically switching to the AWD mode when additional traction is required. But in order to improve fuel economy, an AWD drivetrain 60 may normally operate in the two-wheel drive mode by decoupling the secondary driveline 120 so that that drag on the vehicle 10 is reduced when AWD is not needed. FIG. 2A, illustrates a drivetrain where the primary drivetrain 100 is a front-wheel drivetrain that is being driven by the powertrain 12 when the vehicle 10 is operating in a two-wheel drive mode, and the secondary drivetrain is disconnected. While the embodiment illustrated depicts a vehicle that is normally a front-wheel drive vehicle when in the two-wheel mode, it is also contemplated that the presented disclosure could similarly be applied to a rear-wheel drive vehicle, as a person of ordinary skill in the art would understand.

When operating in the two-wheel drive mode, torque 66 transmitted through the transmission 50 is output to the front drivetrain 100 and a front pair of drive wheels 102. The output side of the transmission 50 may include an output shaft 54 that is connected to a front differential 104. Drive wheels 102 are connected to the differential 104 through respective axles 106. With this arrangement, transmission 50 transmits a powertrain output torque to the drive wheels 102.

In the two-wheel drive mode in FIG. 2A, AWD disconnect devices are open, or decoupled. The AWD disconnect devices may include a disconnect 124 and secondary clutches 126, as shown in the figures. When the AWD disconnect 124 and clutches 126 are disengaged, a driveshaft 128 and a secondary drive unit 130 stop turning. As illustrated, the secondary drive unit is a rear drive unit 130 which may include a rear differential and rear ring and pinion gears, for example. The clutches 126 may also be also be located in the drive unit 130. When the disconnect 124 and the clutches 126 are open the driveshaft 128 and drive unit 130 gearing are isolated from the rest of the vehicle 10 and the powertrain system 12, and their internal friction brings them to a stop so that they do not rotate in the two-wheel drive mode.

When AWD is required, the driveshaft 128 and drive unit 130 must start turning again, and the disconnect devices must be put back into the connected state, so that power can be sent from the engine to the secondary drive wheels 122 so the vehicle can be put into AWD mode. In one embodiment, the AWD disconnect 124 may be a compact and inexpensive disconnect device to save space and cost. Therefore, the AWD disconnect may not have the torque capacity to immediately connect the stationary driveshaft 128 and drive unit 130 to bring them up to speed.

One way to get the driveshaft 128 and the drive unit 130 up to speed is to engage clutches 126 so that the kinetic energy of the moving vehicle is used to start the driveshaft 128 and the drive unit 130 turning. However, when the AWD clutches 126 are applied, especially if the clutches 126 are applied hard to get the driveshaft 128 and the drive unit 130 up to speed quickly, the vehicle speed may drop noticeably and the vehicle may seem to stumble, or sag or display other drivability concerns.

One way to prevent this sag when the secondary drivetrain 120 engages is to momentarily increase the torque to apply more power to the primary drivetrain 100 in order to offset the torque being absorbed at the rear wheels 122. It is difficult to use the engine 20 to apply exact torque because it is difficult for the engine 20 to accurately and quickly change the torque output 62. On the other hand, the electric motor 30 has better ability to shape its torque output 64 accurately and quickly due to its faster response time than the engine. By coordinating the electric motor torque output 64 with the torque being applied by the AWD clutches, rapid engagement to the AWD drive mode is achieved without a perceptible feeling of vehicle sag or stumble.

FIG. 3 illustrates a graph 300 depicting the method of counteracting the drivability concerns when the AWD is required to engage quickly. The AWD clutch torque 310 is a negative torque curve. The actual torque values of the AWD clutch torque 310 may be determined based on the vehicle speed and temperature.

The electric motor 30 applies a positive counteracting torque 312 to the primary drivetrain 100, or in the embodiment illustrated, the electric motor 30 applies the positive counteracting torque 312 to the front drivetrain. As shown in FIG. 3, the electric motor counteracting torque 312 is generally equal to the AWD clutch torque 310. However, the electric motor counteracting torque 312 is generally proportional to the AWD clutch torque 310 based on the transmission 50 gear ratio.

Figure 4:
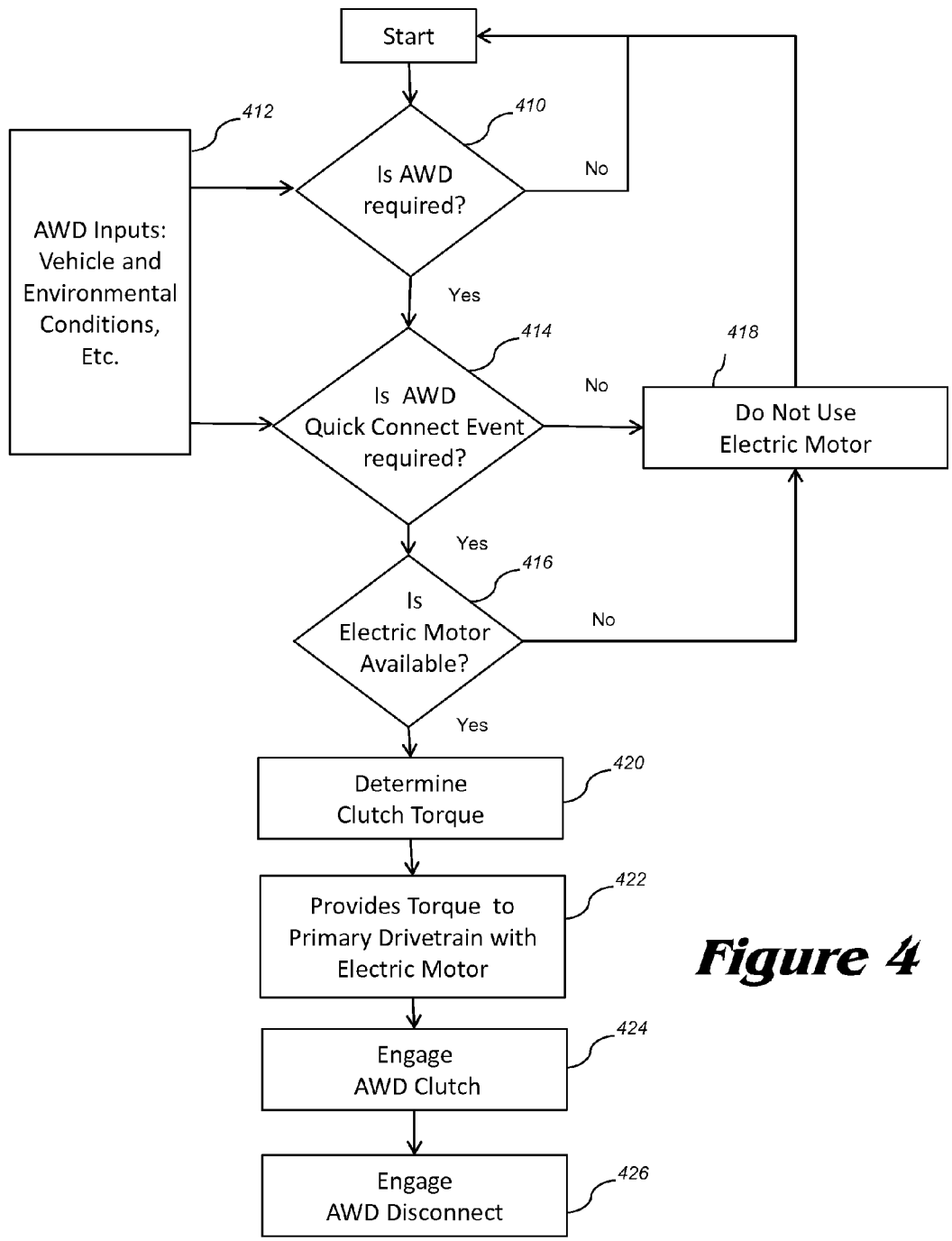
FIG. 4 is a flowchart illustrating a method for controlling the hybrid vehicle between the two-wheel drive mode and the four-wheel drive mode according to an embodiment of the disclosure.

FIG. 4 illustrates a flowchart 400 for automatically controlling the hybrid vehicle between the two-wheel drive mode and the four-wheel drive mode. The vehicle controller 70 determines whether AWD-mode is required, as represented by block 410. AWD mode may be required based on a combination of numerous vehicle and environmental conditions, as represented by block 412. For example, AWD mode may be required because the vehicle senses slip, a low surface coefficient of friction, rough road, longitudinal velocity during turning, yaw error, wet pavement, etc.

If AWD mode is required, the controller determines whether a quick-connect event is required, as represented by block 414. A quick-connect event may be required when of the AWD inputs from block 412 requires more immediate changeover to AWD mode. A quick-connect event may require a total engagement time of the AWD disconnect devices of less than 600 milliseconds. In another embodiment, a quick connect event may have an engagement time between 100 milliseconds to 500 milliseconds.

If a quick-connect event is required, the controller determines if the electric motor 30 is available, as represented by block 416. The electric motor 30 may be unavailable to provide additional output torque 64 due to numerous conditions. For example, the electric motor 30 may be unavailable due to the state-of-charge of the battery 36 or if the electric motor is already producing capacity output torque.

If a quick-connect event is not required, or the electric motor is unavailable, the controller may not command the electric motor to produce increased output torque, as represented by block 418. However, it is also contemplated that the electric motor may be used during AWD connect events that do not require a quick-connect, due to other reasons and advantages.

Next, the controller determines the AWD clutch torque, as represented by block 420. As explained previous, the AWD clutch torque is the amount of torque from the secondary drive wheels based on vehicle speed and temperature.

The controller commands the electric motor to provide the counteracting torque to the primary drivetrain, as represented by block 422. Then the controller commands the AWD clutch to connect, as represented by block 424. By engaging the AWD clutch, the rear drive unit 130 and driveshaft 128 are brought up to speed.

Once the speed of the rear drive unit 130 and driveshaft 128 are synchronized with the speed of the front drivetrain 100, the controller commands the AWD disconnect 124 to engage. The rear drive unit may include a sensor to aid in determining synchronization.

The method illustrated in FIG. 4 is also applicable when the torque required to bring the driveshaft 128 and rear drive unit 130 up to speed is applied through the AWD disconnect 124. The method illustrated in FIG. 4 is also applicable when a single clutch 126 is used at the rear drive unit 130. Further, the method illustrated in FIG. 4 is also applicable to a rear wheel drive based AWD vehicle.

The method of producing a counteracting torque by using the MHT electric motor 30 can much more closely match the inertia torque being diverted by the AWD clutches 126, and therefore do a much better job than the engine 20 for removing the sag or stumble, especially for a quick-connect AWD event because the engine 20 has less accuracy and responsiveness.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid vehicle being operable to change between a two-wheel drive mode and an all-wheel drive (AWD) mode, the hybrid vehicle comprising:
  a powertrain including an electric-motor;
  a primary driveline having a primary pair of drive wheels to receive torque from the powertrain in a two-wheel mode;
  a secondary driveline having a secondary pair of drive wheels;
  an AWD connection device arranged to couple the powertrain to the secondary pair of wheels when an AWD mode is required; and
  a controller, in response to a request to change to the AWD mode, the controller configured to:
    command the electric-motor to apply an increased torque to the primary driveline prior to changing to the AWD mode;

engage the AWD connection device thereby coupling the secondary driveline to the powertrain and changing to the AWD mode,
wherein the electric-motor applies the increased torque to the secondary driveline through the primary driveline while a speed of the secondary driveline is less than a speed of the primary driveline in order to quickly change to the AWD mode without decelerating.

2. The hybrid vehicle of claim 1, wherein the powertrain includes an engine connected in series to the electric-motor such that torque from the engine is transmitted through the electric-motor to the primary driveline,
wherein the first and second drivelines are arranged such that the powertrain applies torque to the secondary driveline through the primary driveline when the AWD connection device is engaged, and
wherein the AWD connection device is disposed between the primary driveline and the secondary driveline.

3. The hybrid vehicle of claim 2 wherein the AWD connection device includes:
at least one AWD clutch arranged to transmit torque from the primary driveline to the secondary driveline when engaged;
a synchronizer and a gear mechanism having a limited ability to apply torque to accelerate the secondary driveline,
wherein the controller is further configured to command the synchronizer and the gear mechanism to engage such that the AWD clutch is also engaged in order to synchronize the secondary driveline quickly.

4. The hybrid vehicle of claim 1, wherein the increased electric-motor torque is proportional to the engagement torque of the AWD connection device in order to minimize vehicle deceleration caused by engagement of the AWD connection device when at least a portion of secondary driveline is rotating asynchronously with the primary driveline.

5. The hybrid vehicle of claim 1, wherein the electric-motor is configured to apply torque to the primary driveline in both the two-wheel drive mode and the AWD mode.

6. The hybrid vehicle of claim 1, wherein the controller is further configured to:
receive a signal indicative of a required engagement torque of the secondary driveline wherein an amount of the increased torque is based on the required engagement torque of the secondary driveline thereby allowing the secondary driveline and the AWD mode to quickly engage in an engagement time less than 500 ms.

7. The hybrid vehicle of claim 1, wherein the controller is further configured to:
command the electric-motor to discontinue the increased torque when the secondary driveline is at a generally synchronous speed of the primary driveline.

8. A vehicle control system comprising:
a powertrain including an electric-motor;
first and second pairs of wheels; and
a controller configured to:
command the electric-motor to apply an increased torque to the first pair of wheels before coupling the second pair of wheels to the powertrain in an all wheel drive (AWD) mode,
wherein the electric-motor applies the increased torque to the second pair of wheels through the first pair of wheels in the AWD mode.

9. The control system of claim 8, wherein the controller is further configured to receive a signal indicative of a required engagement torque of the second pair of wheels wherein an amount of the increased torque is based on the required engagement torque of the second pair of wheels thereby allowing the second pair of wheels and the AWD mode to quickly change from a two-wheel drive mode to the AWD drive mode in an engagement time less than 500 ms.

10. The control system of claim 8, wherein the electric-motor is configured to apply torque to the first pair of wheels in both the two-wheel drive mode and the AWD mode.

11. The control system of claim 8, further comprising:
an AWD connection device arranged to couple the powertrain to the second pair of wheels when an AWD mode is required,
wherein the powertrain includes an engine connected in series to the electric-motor such that torque from the engine is transmitted through the electric-motor to the first pair of wheels,
wherein the first and second pairs of wheels are arranged such that the powertrain applies torque to the second pair of wheels through the first pair of wheels when the AWD connection device is engaged, and
wherein the AWD connection device is disposed between the first and second pair of wheels,
wherein the controller is further configured to control operation of an AWD connection device for coupling and decoupling the second pair of wheels when the four-wheel drive mode is required.

12. The control system of claim 11, wherein the increased electric-motor torque is proportional to the AWD engagement torque in order to maintain a vehicle speed and counteract vehicle deceleration caused by engagement of the AWD connection device.

13. The control system of claim 11, wherein the controller is further configured to:
command the AWD connection device to engage when the second pair of wheels achieve a generally synchronous speed with the first pair of wheels prior to being connected to the powertrain; and
command the electric-motor to discontinue the increased torque when the second pair of wheels is at the generally synchronous speed of the first pair of wheels.

14. The control system of claim 11 wherein the AWD connection device includes:
at least one AWD clutch arranged to transmit torque from the first pair of wheels to second pair of drive wheels when engaged;
a synchronizer and a gear mechanism having a limited ability to apply torque to accelerate the second pair of wheels,
wherein the controller is further configured to command the synchronizer and the gear mechanism to engage such that the AWD clutch is also engaged in order to synchronize the second pair of wheels quickly.

15. A hybrid-vehicle control method comprising:
receiving a request to change from a two-wheel mode to an all wheel drive (AWD) mode;
applying an increased torque by an electric-motor to a primary driveline before to changing to the AWD mode;
coupling a secondary driveline to receive the increased torque from the electric-motor via the primary driveline in order to quickly change to the AWD mode without decelerating.

16. The method of claim 15 further comprising:
measuring the speed of the second pair of wheels to determine a required engagement torque of the secondary driveline; and
engaging at least one clutch to connect the secondary driveline to the powertrain.

17. The method of claim 15 further comprising:
receiving vehicle driving conditions to determine whether the AWD mode is required:
requesting a quick connect event to change from the two-wheel mode to the AWD mode based on vehicle driving conditions.

18. The method of claim 15 further comprising applying a powertrain torque to the primary driveline in the two-wheel mode wherein a powertrain includes an engine connected in series to the electric-motor such that torque from the engine is transmitted through the electric-motor to the primary driveline.

19. The method of claim 15 further comprising:
engaging at least one AWD connection device to connect the secondary driveline to the powertrain; and
discontinuing the increased torque from the electric-motor when the secondary driveline is at a generally synchronous speed of the primary driveline.

20. The method of claim 19 wherein the primary driveline and secondary driveline are arranged such that the powertrain applies torque to the secondary driveline through the primary driveline when the AWD connection device is engaged, and wherein the AWD connection device is disposed between the primary driveline and the secondary driveline.

* * * * *